(12) United States Patent
Kumar et al.

(10) Patent No.: US 6,607,706 B1
(45) Date of Patent: Aug. 19, 2003

(54) COMPOSITE METAL OXIDE PARTICLES

(75) Inventors: Sujeet Kumar, Fremont, CA (US); Hariklia Dris Reitz, Santa Clara, CA (US); Xiangxin Bi, San Ramon, CA (US)

(73) Assignee: NanoGram Corporation, Fremont, CA (US)

( * ) Notice: Subject to any disclaimer, the term of this patent is extended or adjusted under 35 U.S.C. 154(b) by 0 days.

(21) Appl. No.: 09/188,768

(22) Filed: Nov. 9, 1998

(51) Int. Cl.[7] .......................... C01G 45/12; H01M 4/50
(52) U.S. Cl. ...................... 423/593; 423/599; 429/224
(58) Field of Search ................. 423/593, 599; 429/218.1, 224, 231.1, 231.2, 231.5, 231.9; 204/157.4, 157.41, 157.42, 157.5, 157.51; 505/401, 425; 422/186

(56) References Cited

U.S. PATENT DOCUMENTS

| | | | |
|---|---|---|---|
| 4,687,643 A | * 8/1987 | Cortesi et al. | 422/150 |
| 4,980,251 A | 12/1990 | Thackeray et al. | 429/224 |
| 5,013,706 A | * 5/1991 | Schramm et al. | 502/309 |
| 5,425,932 A | 6/1995 | Tarascon | 423/599 |
| 5,478,672 A | 12/1995 | Mitate | |
| 5,589,300 A | * 12/1996 | Fauteux et al. | 429/218 |
| 5,601,796 A | 2/1997 | Frech et al. | 423/599 |
| 5,604,057 A | 2/1997 | Nazri | 429/224 |
| 5,614,472 A | * 3/1997 | Riddle et al. | 505/425 |
| 5,641,465 A | 6/1997 | Ellgen et al. | 423/50 |
| 5,641,468 A | 6/1997 | Ellgen | 423/599 |
| 5,695,887 A | 12/1997 | Amatucci et al. | 429/48 |
| 5,759,720 A | 6/1998 | Amatucci | 429/224 |
| 5,770,018 A | 6/1998 | Saidi | |
| 5,807,646 A | 9/1998 | Iwata et al. | |
| 5,874,058 A | 2/1999 | Sheargold et al. | 423/599 |
| 5,883,032 A | 3/1999 | Bogdan et al. | |
| 5,907,066 A | * 5/1999 | Wachs | 568/472 |
| 5,928,622 A | * 7/1999 | Hwang et al. | 423/594 |
| 5,952,125 A | * 9/1999 | Bi et al. | 429/231.2 |
| 5,958,348 A | 9/1999 | Bi et al. | |
| 5,958,361 A | * 9/1999 | Laine et al. | 423/592 |
| 5,965,293 A | 10/1999 | Idota et al. | |
| 5,989,514 A | * 11/1999 | Bi et al. | 423/592 |
| 6,099,798 A | * 8/2000 | Kambe et al. | 422/24 |
| 6,193,936 B1 | * 2/2001 | Gardner et al. | 422/186 |

FOREIGN PATENT DOCUMENTS

| | | |
|---|---|---|
| EP | 0117755 A2 * | 5/1984 |
| EP | 0492880 A2 * | 1/1992 |
| EP | 0 520 217 B1 | 12/1992 |
| EP | 0 417 538 B1 | 11/1994 |
| EP | 0 776 862 A1 | 6/1997 |
| EP | 0 820 113 A1 | 1/1998 |
| EP | 0 837 036 A1 | 4/1998 |
| FR | 2 677 558 | 12/1992 |
| GB | 2 299 988 | 10/1996 |
| JP | 2296732 | 12/1990 |
| WO | WO 96/12676 | 5/1996 |
| WO | WO 97/20773 | 6/1997 |
| WO | WO 97/37935 | 10/1997 |

OTHER PUBLICATIONS

"Nanocomposite Manganese Oxide for Rechargeable Lithium Batteries" by, J. Kim et al., Electrochemical and Solid–State Letters, 1 (5) 207–209 (Sep. 1998).

"Modeling a Porous Intercalation Electrode with Two Characteristic Particle Sizes" by, Darling et al., J. Electrochem. Soc., vol. 144, No. 12, Dec. 1997, pp. 4201–4207.

* cited by examiner

*Primary Examiner*—Stanley S. Silverman
*Assistant Examiner*—Cam N. Nguyen
(74) *Attorney, Agent, or Firm*—Patterson, Thuente, Skaar & Christensen, P.A.; Peter S. Dardi; David Kleinsmith (57) ABSTRACT

A powder of lithiated manganese oxide has an average particle diameter preferably less than about 250 nm. The particles have a high degree of uniformity and preferably a very narrow particle size distribution. The lithiated manganese oxide can be produce by the reaction of an aerosol where the aerosol comprises both a first metal (lithium) precursor and a second metal (manganese) precursor. Preferably, the reaction involves laser pyrolysis where the reaction is driven by heat absorbed from an intense laser beam.

21 Claims, 6 Drawing Sheets

COMPOSITE METAL OXIDE PARTICLES

FIELD OF THE INVENTION

The invention relates to composite metal oxide powders. More particularly, the invention relates to highly uniform, nanoscale composite metal oxide particles, such as lithiated manganese oxide, produced by laser pyrolysis.

BACKGROUND OF THE INVENTION

Manganese can exist in various oxidation states. Correspondingly, manganese oxides are known to exist with various stoichiometries. In addition, manganese oxides with a particular stoichiometry can have various crystalline lattices, or they can be amorphous. Thus, manganese oxides exhibit an extraordinarily rich phase diagram. Various crystalline forms of manganese oxide, as well as other metal oxides, can accommodate lithium atoms and/or ions into its lattice.

The ability of metal oxide, such as manganese oxide, to intercalate lithium can be used advantageously for the production of lithium and lithium ion batteries. In particular, $Li_xMn_2O_4$, $0<x<2$ can be used in the formation of cathodes for secondary batteries, i.e., rechargeable batteries. These are referred to as "rocking-chair" batteries by their ability to reversibly vary x between certain values as the battery charges or discharges. The lithiated manganese oxides can have a variety of crystal structures. Because of the interest in lithiated manganese oxides and other composite metal oxides, there is considerable interest in developing better approaches for producing composite metal oxides, such as lithiated manganese oxide.

SUMMARY OF THE INVENTION

In a first aspect, the invention pertains to a method of producing a composite metal oxide particles, the method comprising reacting an aerosol to form a powder of composite metal oxide particles with an average diameter less than about one micron, the aerosol comprising a first metal compound precursor and a second metal compound precursor.

In a further aspect, the invention pertains to a method for producing lithium metal oxide, the method comprising pyrolyzing a reactant stream in a reaction chamber, the reactant stream comprising a lithium precursor, a non-lithium metal precursor, an oxidizing agent, and an infrared absorber, where the pyrolysis is driven by heat absorbed from a light beam.

DETAILED DESCRIPTION OF THE PREFERRED EMBODIMENTS

Lithiated manganese oxide particles having diameters substantially less than a micron have been produced directly by laser pyrolysis. Laser pyrolysis with an aerosol based reactant delivery provides for the direct production of lithium/manganese composite materials. Lithiated manganese oxide nanoparticles preferably are produced by laser pyrolysis with a relatively high production rate. Heat processing of the composite materials results in crystalline lithiated manganese oxide particles. The small size of the particles results in a significantly increased surface area for a given weight of material. The aerosol based approach described herein can be used for the production of other composite metal oxides, in particular other lithiated metal oxides such as lithiated vanadium oxides.

Preferred collections of composite metal oxide particles have an average diameter less than a micron and a very narrow distribution of particle diameters. Furthermore, the collection of composite metal oxides preferably are very uniform. In particular, the distribution of particle diameters preferably does not have a tail. In other words, there are effectively no particles with a diameter significantly greater than the average diameter such that the particle size distribution rapidly drops to zero.

To generate the desired nanoparticles, laser pyrolysis is used either alone or in combination with additional processing. Specifically, laser pyrolysis has been found to be an excellent process for efficiently producing lithiated manganese oxide nanoparticles with a narrow distribution of average particle diameters. In addition, nanoscale lithiated manganese oxide particles produced by laser pyrolysis can be subjected to heating in an oxygen environment or an inert environment to alter the crystal properties of the lithiated manganese oxide particles without destroying the nanoparticle size.

A basic feature of successful application of laser pyrolysis for the production of composite metal oxide (lithiated manganese oxide) nanoparticles is production of a reactant stream containing a first metal (e.g., lithium) precursor, a second metal (e.g., manganese) precursor, a radiation absorber and an oxygen source. The second metal precursor involves a different metal than the first metal precursor. In preferred embodiments, the first metal (lithium) precursor and/or the second metal (manganese) precursor are supplied as an aqueous solution or solutions that are formed in an aerosol and injected into the pyrolysis chamber using an ultrasonic nozzle. The novel injection system for the laser pyrolysis instrument is described in greater detail below. Additional metal precursors can be included to produce ternary and higher metal particles.

The reactant stream is pyrolyzed by an intense laser beam. The intense heat resulting from the absorption of the laser radiation induces the oxidation of the first metal (lithium) precursor, second metal (manganese) precursor, any additional metal precursors in the oxidizing environment. The laser pyrolysis provides for formation of phases of materials that are difficult to form under thermodynamic equilibrium conditions. As the reactant stream leaves the laser beam, the composite metal oxide particles are rapidly quenched.

As noted above, lithium atoms and/or ions can intercalate into various forms of manganese oxide. The result is lithiated manganese oxide. As described herein, lithiated manganese oxide is formed directly as a composite. The lithiated manganese oxide nanoparticles can be incorporated into a film with a binder such as a polymer. The film preferably incorporates additional electrically conductive particles held by a binder along with the lithiated manganese oxide particles. The film can be used as a cathode in a lithium battery or a lithium ion battery.

A. Particle Production

Laser pyrolysis has been discovered to be a valuable tool for the direct production of nanoscale lithiated manganese oxide particles and composite metal oxides, generally. In addition, the particles produced by laser pyrolysis are a convenient material for further processing to expand the pathways for the production of desirable composite metal oxide particles and to improve the particle properties. Thus, using laser pyrolysis alone or in combination with additional processes, a wide variety of composite metal oxide particles can be produced.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce lithiated manganese oxide particles in a particular apparatus are described below in the Examples. Furthermore, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant gas flow rate and velocity of the reactant gas stream are inversely related to particle size so that increasing the reactant gas flow rate or velocity tends to result in smaller particle size. Also, the growth dynamics of the particles have a significant influence on the size of the resulting particles. In other words, different forms of a product compound have a tendency to form different size particles from other phases under relatively similar conditions. Laser power also influences particle size with increased laser power favoring larger particle formation for lower melting materials and smaller particle formation for higher melting materials.

Laser pyrolysis has been performed generally with gas phase reactants. The use of exclusively gas phase reactants is somewhat limiting with respect to the types of precursor compounds that can be used. Thus, techniques have been developed to introduce aerosols containing reactant precursors into laser pyrolysis chambers. The aerosol atomizers can be broadly classified as ultrasonic atomizers, which use an ultrasonic transducer to form the aerosol, or as mechanical atomizers, which use energy from one or more flowing fluids (liquids, gases, or supercritical fluids) themselves to form the aerosol.

Furthermore, as described herein, aerosol based approaches can be used to produce metal composite particles by the introduction of multiple metal compounds into a solution to be delivered as an aerosol in the reaction chamber. Improved aerosol delivery apparatuses for reactant systems are described further in commonly assigned and simultaneously filed U.S. patent application Ser. No. 09/188,670, now U.S. Pat. No. 6,193,936 to Gardner et al., entitled "Reactant Delivery Apparatuses," incorporated herein by reference. If desired, selected metal precursors can be delivered in the reaction chamber as an aerosol while others are delivered as a vapor.

Using aerosol delivery apparatuses, solid precursor compounds can be delivered by dissolving the compounds in a solvent. Alternatively, powdered precursor compounds can be dispersed in a liquid/solvent for aerosol delivery. Liquid precursor compounds can be delivered as an aerosol from a neat liquid, a liquid/gas mixture or a liquid solution, if desired. Aerosol reactants can be used to obtain significant reactant throughput. The solvent, if any, can be selected to achieve desired properties of the solution. Suitable solvents include water, methanol, ethanol and other organic solvents. The solvent should have a desired level of purity such that the resulting particles have a desired purity level.

If the aerosol precursors are formed with a solvent present, the solvent is rapidly evaporated by the laser beam in the reaction chamber such that a gas phase reaction can take place. Thus, the fundamental features of the laser pyrolysis reaction is unchanged. However, the reaction conditions are affected by the presence of the aerosol. Below, examples are described for the production of lithiated manganese oxide nanoparticles using aerosol precursors using a particular laser pyrolysis reaction chamber. The parameters associated with aerosol reactant delivery can be explored fully based on the description below.

A number of suitable solid, manganese precursor compounds can be delivered as an aerosol from solution. For example, manganese chloride ($MnCl_2$) is soluble in water and alcohols and manganese nitrate ($Mn(NO_3)_2$) is soluble in water and certain organic solvents. Similarly, as substitutes for the manganese precursors, suitable vanadium precursors include, for example, $VOCl_2$, which is soluble in absolute alcohol. Also, suitable lithium precursors for aerosol delivery from solution include, for example, lithium chloride (LiCl), which is somewhat soluble in water, alcohol and some other organic solvents, and lithium nitrate ($LiNO_3$), which is somewhat soluble in water and alcohol.

The compounds are dissolved in a solution preferably with a concentration greater than about 0.5 molar. Generally, the greater the concentration of precursor in the solution the greater the throughput of reactant through the reaction chamber. As the concentration increases, however, the solution can become more viscous such that the aerosol has droplets with larger sizes than desired. Thus, selection of solution concentration can involve a balance of factors in the determination of a preferred solution concentration. In the formation of composite particles, the relative amounts of the metal precursors also influences the relative amount of the metals in the resulting particles. Thus, the relative amounts of different metal precursors is selected to yield a desired product particle composition.

Preferred reactants serving as oxygen source include, for example, $O_2$, CO, $CO_2$, $O_3$ and mixtures thereof. The reactant compound from the oxygen source should not react significantly with the manganese or lithium precursor prior to entering the reaction zone since this generally would result in the formation of large particles.

Laser pyrolysis can be performed with a variety of optical laser frequencies. Preferred lasers operate in the infrared portion of the electromagnetic spectrum. $CO_2$ lasers are particularly preferred sources of laser light. Infrared absorbers for inclusion in the molecular stream include, for example, $C_2H_4$, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the radiation beam increases the temperature at a tremendous rate, many times the rate that heat generally would be produced even by strongly exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. Appropriate shielding gases include, for example, Ar, He and $N_2$.

An appropriate laser pyrolysis apparatus generally includes a reaction chamber isolated from the ambient environment. A reactant inlet connected to a reactant supply system produces a reactant stream through the reaction chamber. A laser beam path intersects the reactant stream at a reaction zone. The reactant/product stream continues after the reaction zone to an outlet, where the reactant/product stream exits the reaction chamber and passes into a collection system. Generally, the laser is located external to the reaction chamber, and the laser beam enters the reaction chamber through an appropriate window.

Figure 1:
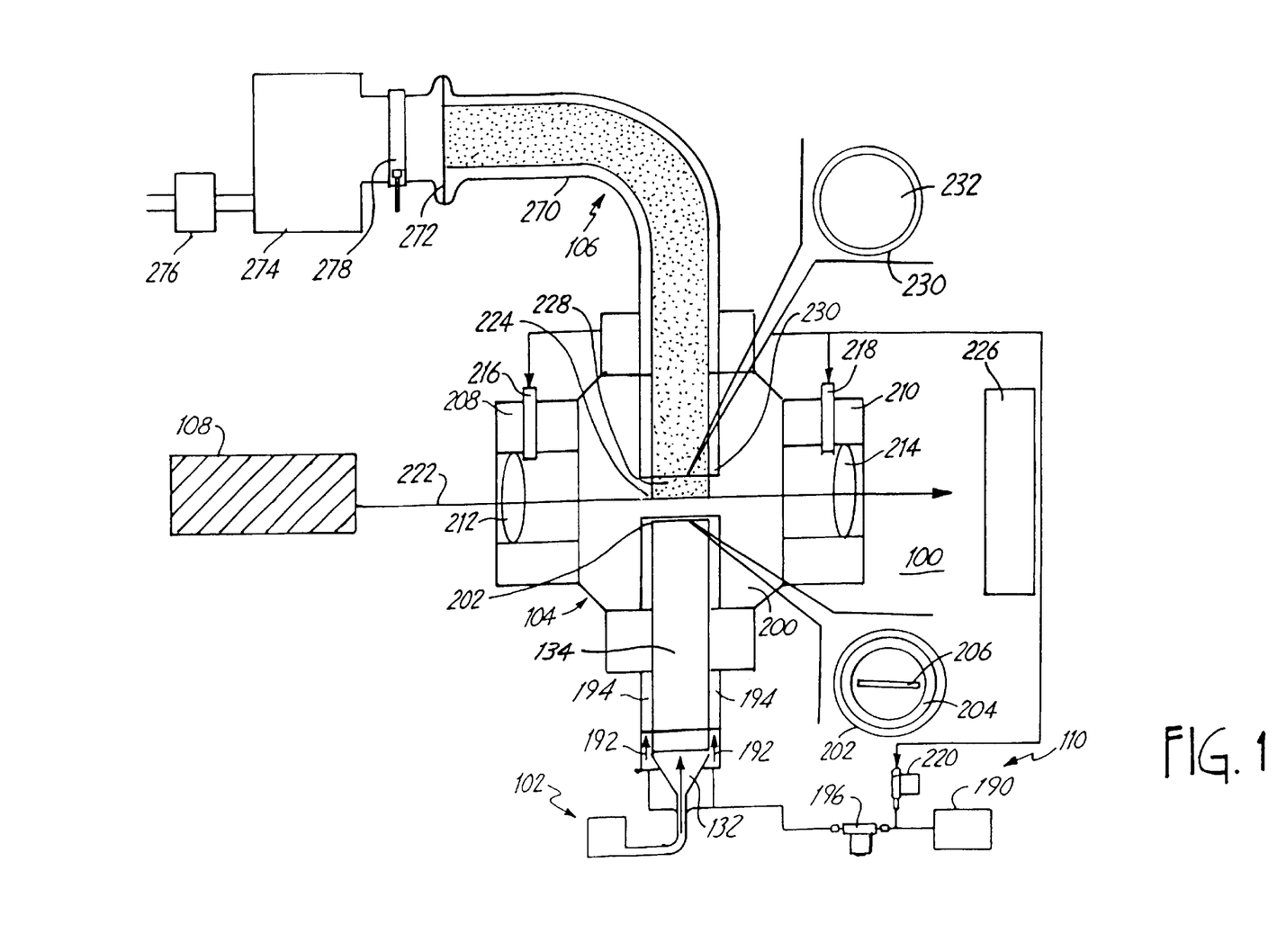
FIG. 1 is a schematic, sectional view of an embodiment of a laser pyrolysis apparatus taken through the middle of the laser radiation path. The upper insert is a bottom view of the injection nozzle, and the lower insert is a top view of the collection nozzle.

Referring to FIG. 1, a particular embodiment 100 of a pyrolysis apparatus involves a reactant supply system 102, reaction chamber 104, collection system 106, laser 108 and shielding gas delivery system 110. Reactant supply system 102 is used to deliver one or more reactants as an aerosol.

Figure 2:
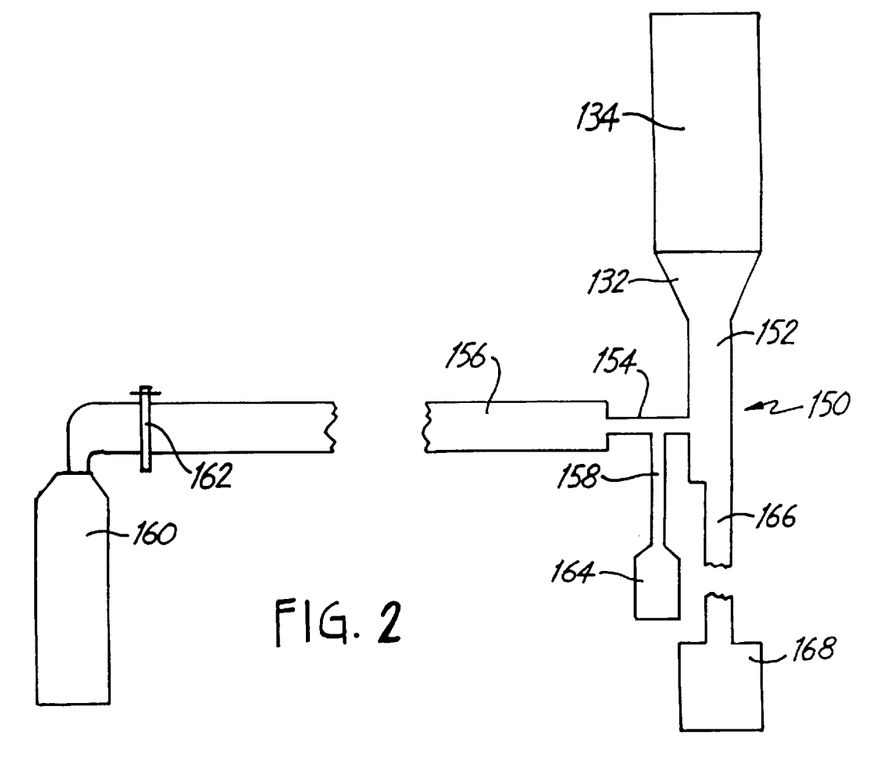
FIG. 2 is schematic, side view of a reactant delivery apparatus, for the delivery of an aerosol reactant to the laser pyrolysis apparatus of FIG. 1.

Referring to FIG. 2, reactant supply system 102 is used to supply an aerosol to duct 132. Duct 132 connects with rectangular channel 134, which forms part of an injection nozzle for directing reactants into the reaction chamber. Reactant supply system 102 includes a delivery tube 152 that is connected to duct 132. Venturi tube 154 connects to delivery tube 152 as a source of the aerosol. Venturi tube 154 is connected to gas supply tube 156 and liquid supply tube 158.

Gas supply tube 156 is connected to gas source 160. Gas source 160 can include a plurality of gas containers that are connected to deliver a selected gas mixture to gas supply tube 156. The flow of gas from gas source 160 to gas supply tube 156 is controlled by one or more valves 162. Liquid supply tube 158 is connected to liquid supply 164. Delivery tube 152 also connects with drain 166 that flows to reservoir 168.

In operation, gas flow through venturi tube 154 creates suction that draws liquid into venturi tube 154 from liquid supply tube 158. The gas liquid mixture in venturi tube 154 forms an aerosol when venturi tube 154 opens into delivery tube 152. The aerosol is drawn up into duct 132 by pressure within the system. Any aerosol that condenses within delivery tube 152 is collected in reservoir 168, which is part of the closed system. Suitable venturi based aerosol generators for attachment to duct 132 include, for example, model 3076 from the Particle Instrument Division, TSI Inc., Saint Paul, Minn.

Referring to FIG. 1, shielding gas delivery system 110 includes inert gas source 190 connected to an inert gas duct 192. Inert gas duct 192 flows into annular channel 194. A mass flow controller 196 regulates the flow of inert gas into inert gas duct 192.

The reaction chamber 104 includes a main chamber 200. Reactant supply system 102 connects to the main chamber 200 at injection nozzle 202. The end of injection nozzle 202 has an annular opening 204 for the passage of inert shielding gas, and a rectangular slit 206 for the passage of reactants to form a reactant stream in the reaction chamber. The end of injection nozzle 202 can be seen in the lower insert of FIG. 1. Annular opening 204 has, for example, a diameter of about 1.5 inches and a width along the radial direction from about ⅛ in to about 1⁄16 in. The flow of shielding gas through annular opening 204 helps to prevent the spread of the reactants and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably cylindrical lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 190 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. A conventional light source preferably produces considerable amount of infrared light. Preferably, laser 108 is an infrared laser, especially a CW $CO_2$ laser such as an 1800 watt maximum power output laser available from PRC Corp., Landing, N.J.

Reactants passing through slit 206 in injection nozzle 202 initiate a reactant stream. The reactant stream passes through reaction zone 224, where reaction involving the lithium precursor compound and the manganese precursor compound takes place. Heating of the gases in reaction zone 224 is extremely rapid, roughly on the order of $10^5$ degree C./sec depending on the specific conditions. The reaction is rapidly quenched upon leaving reaction zone 224, and particles 228 are formed in the reactant/product stream. The nonequilibrium nature of the process allows for the production of nanoparticles with a highly uniform size distribution and structural homogeneity.

The path of the reactant\product stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106. The end of collection nozzle 230 can be seen in the upper insert of FIG. 1.

The chamber pressure is monitored with a pressure gauge attached to the main chamber. The preferred chamber pressure for the production of the desired oxides generally ranges from about 80 Torr to about 500 Torr.

Reaction chamber 104 has two additional tubular sections not shown. One of the additional tubular sections projects into the plane of the sectional view in FIG. 2, and the second additional tubular section projects out of the plane of the sectional view in FIG. 2. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection system 106 includes a curved channel 270 leading from collection nozzle 230. Because of the small size of the particles, the product particles follow the flow of the gas around curves. Collection system 106 includes a filter 272 within the gas flow to collect the product particles. A variety of materials such as Teflon, glass fibers and the like can be used for the filter as long as the material is inert and has a fine enough mesh to trap the particles. Preferred materials for the filter include, for example, a glass fiber filter from ACE Glass Inc., Vineland, N.J. and cylindrical polypropylene filters from Cole-Parmer Instrument Co., Vernon Hills, Ill.

Pump 274 is used to maintain collection system 106 at a selected pressure. A variety of different pumps can be used. Appropriate pumps for use as pump 274 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 276 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by a valve 278 such as a manual needle valve or an automatic throttle valve inserted between pump 274 and filter 272. As the chamber pressure increases due to the accumulation of particles on filter 272, valve 278 can be adjusted to maintain the pumping rate and the corresponding chamber pressure.

The reaction can be continued until sufficient particles are collected on filter 272 such that the pump can no longer maintain the desired pressure in the reaction chamber 104 against the resistance through filter 272. When the pressure in reaction chamber 104 can no longer be maintained at the desired value, the reaction is stopped, and the filter 272 is removed. With this embodiment, about 1–300 grams of particles can be collected in a single run before the chamber pressure can no longer be maintained. A single run generally can last up to about 10 hours depending on the type of particle being produced and the type of filter being used.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the top of the reaction chamber, and the product particles are collected from the bottom of the chamber. In this configuration, the collection system may not include a curved section so that the collection filter is mounted directly below the reaction chamber.

An alternative design of a laser pyrolysis apparatus has been described. See, copending and commonly assigned U.S. patent application Ser. No. 08/808,850, now U.S. Pat. No. 5,958,348, entitled "Efficient Production of Particles by Chemical Reaction," incorporated herein by reference. This alternative design is intended to facilitate production of commercial quantities of particles by laser pyrolysis. The introduction of aerosol reactants into this alternative apparatus design is described in copending and simultaneously filed U.S. patent application Ser. No. 09/188,670, now U.S. Pat. No. 6,193,936 to Gardner et al., entitled "Reactant Delivery Apparatuses," incorporated herein by reference. The production of manganese oxide particles using this alternative design of the reaction chamber with an aerosol delivery system is described in commonly assigned and simultaneously filed U.S. patent application Ser. No. 09/188, 770 to Kumar et al., entitled "Metal Oxide Particles," incorporated herein by reference.

In general, the alternative apparatus includes a reaction chamber designed to reduce contamination of the chamber walls, to increase the production capacity and to make efficient use of resources. To accomplish these objectives, an elongated reaction chamber is used that provides for an increased throughput of reactants and products without a corresponding increase in the dead volume of the chamber. The dead volume of the chamber can become contaminated with unreacted compounds and/or reaction products. In some embodiments, the chamber has a cross section along a direction perpendicular to a reactant stream with a dimension along a major axis greater than a factor of about two larger than a dimension along a minor axis.

Figure 3:
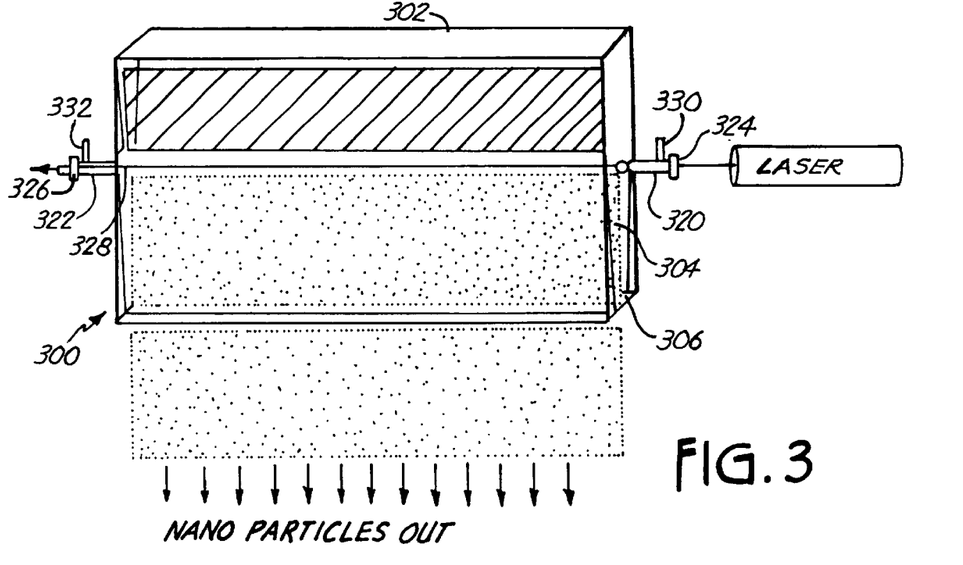
FIG. 3 is a schematic, perspective view of an elongated reaction chamber for the performance of laser pyrolysis, where components of the reaction chamber are shown as transparent to reveal internal structure.

The design of the improved reaction chamber 300 is schematically shown in FIG. 3. A reactant inlet 302 enters the main chamber 304. Reactant inlet 302 conforms generally to the shape of main chamber 304. Main chamber 304 includes an outlet 306 along the reactant/product stream for removal of particulate products, any unreacted gases and inert gases. Tubular sections 320, 322 extend from the main chamber 304. Tubular sections 320, 322 hold windows 324, 326 to define a laser beam path 328 through the reaction chamber 300. Tubular sections 320, 322 can include shielding gas inlets 330, 332 for the introduction of shielding gas into tubular sections 320, 322. Shielding gas can also be introduced through shielding gas inlets around the reactant inlet to form a blanket of shielding gas around the reactant stream.

Figure 4:
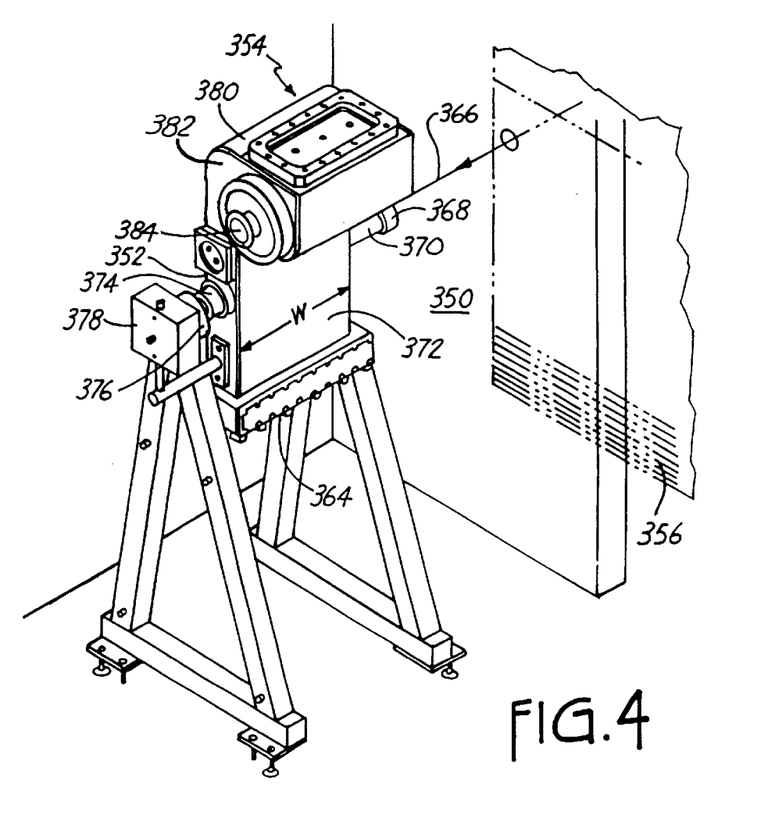
FIG. 4 is a perspective view of an embodiment of an elongated reaction chamber for performing laser pyrolysis.
Figure 5:
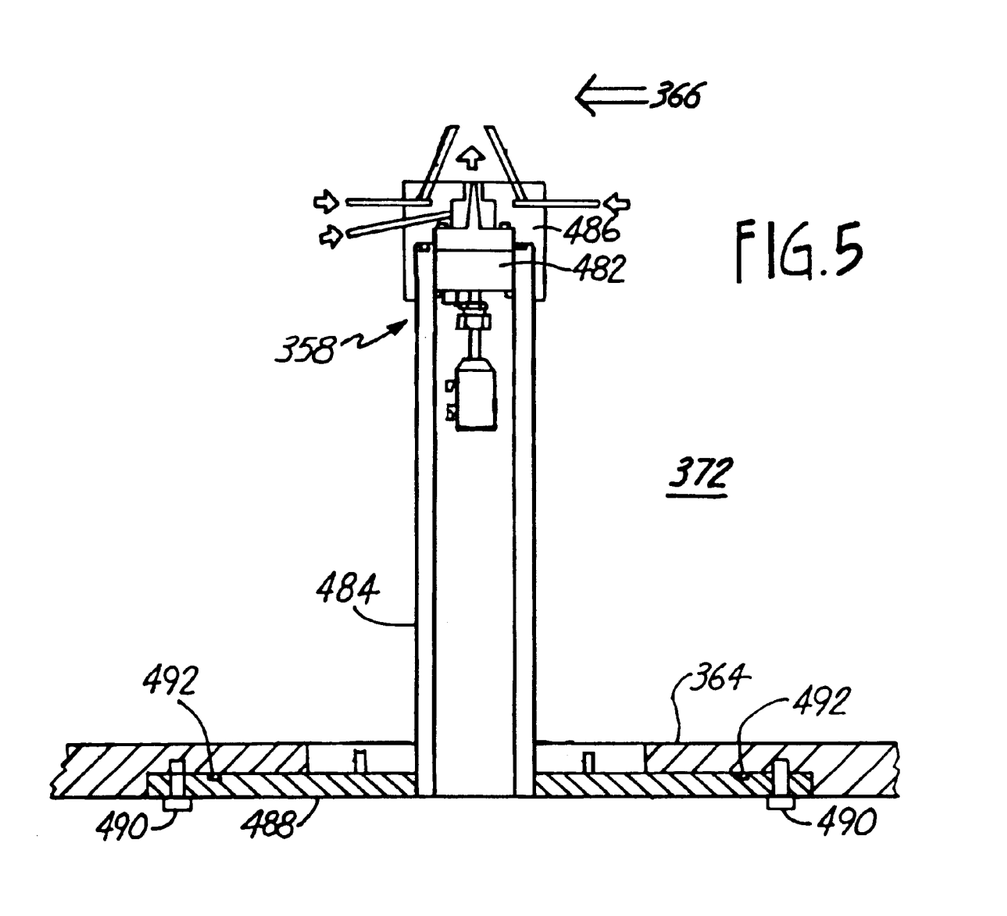
FIG. 5 is a sectional, side view of a reactant delivery apparatus for the delivery of an aerosol reactant into the reaction chamber of FIG. 4, where the section is taken through the center of the reactant delivery apparatus.

Referring to FIG. 4, a specific embodiment of a laser pyrolysis reaction system 350 with aerosol reactant delivery includes reaction chamber 352, a particle collection system 354, laser 356 and a reactant delivery apparatus. A variety of embodiments of the reactant delivery apparatuses can be used to provide aerosol reactants. One embodiment of a reactant delivery apparatus 358 to delivery an aerosol is depicted in FIG. 5. Additional embodiments of aerosol delivery apparatuses for use with reactant chamber 252 are described in copending and simultaneously filed U.S. patent application Ser. No. 09/188,670, now U.S. Pat. No. 6,193,936 to Gardner et al., entitled "Reactant Delivery Apparatuses," incorporated herein by reference. The reactant delivery apparatus may or may not provide an aerosol that is elongated along the elongated dimension of reaction chamber 352.

Reaction chamber 352 includes reactant inlet 364 at the bottom of reaction chamber 352. In this embodiment, the reactants are delivered from the bottom of the reaction chamber while the products are collected from the top of the reaction chamber. The configuration can be reversed with the reactants supplied from the top and product collected from the bottom, if desired. Reactant delivery apparatus 358 is connected to the reaction chamber at reactant inlet 364.

For the performance of laser pyrolysis based reaction synthesis, the aerosol generally is mixed with one or more additional reactant gases, a laser absorbing gas if the reactants do not sufficiently absorb the laser radiation, and, optionally, an inert gas. The gases can be supplied from a pressurized cylinder or other suitable container. In addition, multiple reactants can be mixed in the liquid phase and delivered as the aerosol.

Reaction chamber 352 is elongated along one dimension denoted in FIG. 4 by "w". A laser beam path 366 enters the reaction chamber through a window 368 displaced along a tube 370 from the main chamber 372 and traverses the elongated direction of the reaction chamber. The laser beam passes through tube 374 and exits window 376 and terminates at beam dump 378. In operation, the laser beam intersects a reactant stream generated through reactant inlet 364.

The top of main chamber 372 opens into particle collection system 354. Particle collection system 354 includes outlet duct 380 connected to the top of main chamber 372 to receive the flow from main chamber 372. Outlet duct 380 carries the product particles out of the plane of the reactant stream to a cylindrical filter within compartment 382. Compartment 382 is connected to a pump through port 384. The filter blocks flow from duct 380 to port 384 such that particles within the flow are collected on the filter.

Referring to FIG. 5, reactant delivery apparatus 358 includes an aerosol generator 482 is supported by mount 484 and a cap 486. Reactant delivery apparatus 358 is secured to reactant inlet 364 to extend within main chamber 372 of FIGS. 4. Mount 484 is connected to a base plate 488. Base plate 488 is fastened to reactant inlet 364 with bolts 490. An o-ring or the like, suitably shaped, can be placed within hollow 492 to form a seal between base plate 488 and reactant inlet 364.

As noted above, properties of the product particles can be modified by further processing. In particular, lithiated manganese oxide nanoscale particles can be heated in an oven in an oxidizing environment or an inert environment to alter the oxygen content, to change the crystal lattice, or to remove adsorbed compounds on the particles to improve the quality of the particles.

The use of sufficiently mild conditions, i.e., temperatures well below the melting point of the particles, results in modification of the lithiated manganese oxide particles without significantly sintering the particles into larger particles. The processing of metal oxide nanoscale particles in an oven is discussed further in copending and commonly assigned. U.S. patent application Ser. No. 08/897,903, U.S. Pat. No. 5,989,514 filed Jul. 21, 1997, entitled "Processing of Vanadium Oxide Particles With Heat," incorporated herein by reference.

A variety of apparatuses can be used to perform the heat processing. An example of an apparatus 700 to perform this processing is displayed in FIG. 6. Apparatus 700 includes a tube 702 into which the particles are placed. Tube 702 is connected to a reactant gas source 704 and inert gas source 706. Reactant gas, inert gas or a combination thereof are placed within tube 702 to produce the desired atmosphere.

Figure 6:
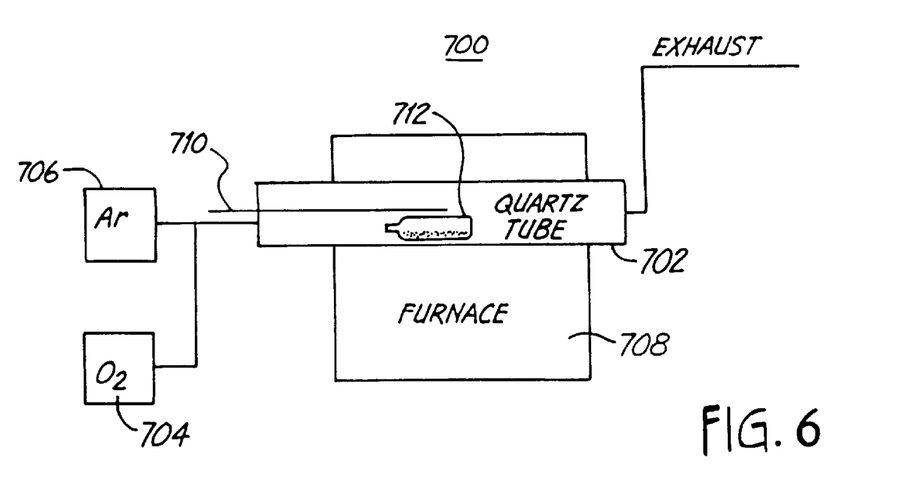
FIG. 6 is a schematic, sectional view of an oven for heating nanoparticles, in which the section is taken through the center of the quartz tube.

Preferably, the desired gases are flowed through tube 702. Appropriate reactant gases to produce an oxidizing environment include, for example, $O_2$, $O_3$, CO, $CO_2$ and combinations thereof. The reactant gas can be diluted with inert gases such as Ar, He and $N_2$. The gases in tube 702 can be exclusively inert gases if an inert atmosphere is desired. The reactant gases may not result in changes to the stoichiometry of the particles being heated.

Tube 702 is located within oven or furnace 708. Oven 708 maintains the relevant portions of the tube at a relatively constant temperature, although the temperature can be varied systematically through the processing step, if desired. Temperature in oven 708 generally is measured with a thermocouple 710. The lithiated manganese oxide particles can be placed in tube 702 within a vial 712. Vial 712 prevents loss of the particles due to gas flow. Vial 712 generally is oriented with the open end directed toward the direction of the source of the gas flow.

The precise conditions including type of oxidizing gas (if any), concentration of oxidizing gas, pressure or flow rate of gas, temperature and processing time can be selected to produce the desired type of product material. The temperatures generally are mild, i.e., significantly below the melting point of the material. The use of mild conditions avoids interparticle sintering resulting in larger particle sizes. Some controlled sintering of the particles can be performed in oven 708 at somewhat higher temperatures to produce slightly larger, average particle diameters.

For the processing of lithiated manganese oxide, for example, the temperatures preferably range from about 50° C. to about 600° C. and more preferably from about 50° C. to about 550° C. The particles preferably are heated for about 5 minutes to about 100 hours. Some empirical adjustment may be required to produce the conditions appropriate for yielding a desired material.

B. Particle Properties

A collection of particles of interest preferably has an average diameter for the primary particles of less than about 250 nm, preferably from about 5 nm to about 100 nm, more preferably from about 5 nm to about 50 nm. The primary particles usually have a roughly spherical gross appearance. Upon closer examination, crystalline lithiated manganese oxide particles generally have facets corresponding to the underlying crystal lattice. Nevertheless, the primary particles tend to exhibit growth that is roughly equal in the three physical dimensions to give a gross spherical appearance. Generally, 95 percent of the primary particles, and preferably 99 percent, have ratios of the dimension along the major axis to the dimension along the minor axis less than about 2. Diameter measurements on particles with asymmetries are based on an average of length measurements along the principle axes of the particle.

Because of their small size, the primary particles tend to form loose agglomerates due to van der Waals and other electromagnetic forces between nearby particles. Nevertheless, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, $TiO_2$ nanoparticles generally exhibit altered absorption properties based on their small size, as described in copending and commonly assigned U.S. patent application Ser. No. 08/962,515, now U.S. Pat. No. 6,099,798, entitled "Ultraviolet Light Block and Photocatalytic Materials," incorporated herein by reference.

Laser pyrolysis, as described above, generally results in particles having a very narrow range of particle diameters. With aerosol delivery, the distribution of particle diameters is particularly sensitive to the reaction conditions. Nevertheless, if the reaction conditions are properly controlled, a very narrow distribution of particle diameters can be obtained with an aerosol delivery system as described above. The primary particles preferably have a high degree of uniformity in size. When mixed phase materials are formed, it is sometimes observed that each phase has a separate narrow size distribution such that the mixed phase materials overall involves multiple overlapping narrow distributions.

As determined from examination of transmission electron micrographs, the primary particles of a single phase and possibly multiple phases generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent of the primary particles have a diameter greater than about 60 percent of the average diameter and less than about 140 percent of the average diameter.

Furthermore, in preferred embodiments essentially no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail indicates that there are less than about 1 particle in $10^6$ have a diameter greater than a particular cut off value above the average diameter. The narrow size distributions, lack of a tail in the distributions and the roughly spherical morphology can be exploited in a variety of applications. Also, crystalline lithiated manganese oxide particles produced by annealing (heating) particles made by laser pyrolysis have a high degree of crystallinity.

Lithium manganese oxide is known to exist in a variety of oxidation states and several crystalline phases corresponding to the underlying crystal structure of the manganese oxide and the degree of lithium intercalation. The phase diagram of lithiated manganese oxide is extremely complex. The manganese oxygen ratio can vary from 1:1 to 1:2. Also, the ratio of lithium to manganese, i.e., the amount of lithium intercalated into the manganese oxide lattice, can vary from 0 to 2:1. Also, for a given stoichiometry such as $LiMn_2O_4$, the crystal structure can be a cubic spinel or other crystal structures. Different portions of the vast phase diagram can be explored by varying the processing parameters.

EXAMPLES

Example 1
Laser Pyrolysis; Aerosol Metal Precursors

The synthesis of magnesium oxide/lithiated manganese oxide particles described in this example was performed by laser pyrolysis. The particles were produced using essentially the laser pyrolysis apparatus of FIG. 1, described above, using the reactant delivery apparatus of FIG. 2.

The manganese chloride (Alfa Aesar, Inc., Ward Hill, Mass.) precursor and lithium chloride (Alfa Aesar, Inc.) precursor were dissolved into deionized water. The aqueous solution had a concentration of 4 molar LiCl and 4 molar $MnCl_2$. The aqueous solution with the two metal precursors was carried into the reaction chamber as an aerosol. $C_2H_4$ gas was used as a laser absorbing gas, and Argon was used as an inert gas. $O_2$, Ar and $C_2H_4$ were delivered into the gas supply tube of the reactant supply system. The reactant mixture containing $MnCl_2$, LiCl, Ar, $O_2$ and $C_2H_4$ was introduced into the reactant nozzle for injection into the reaction chamber. The reactant nozzle had an opening with dimensions of ⅝ in.×1/16 in. Additional parameters of the laser pyrolysis synthesis relating to the particles of Example 1 are specified in Table 1.

TABLE 1

Figure 7:
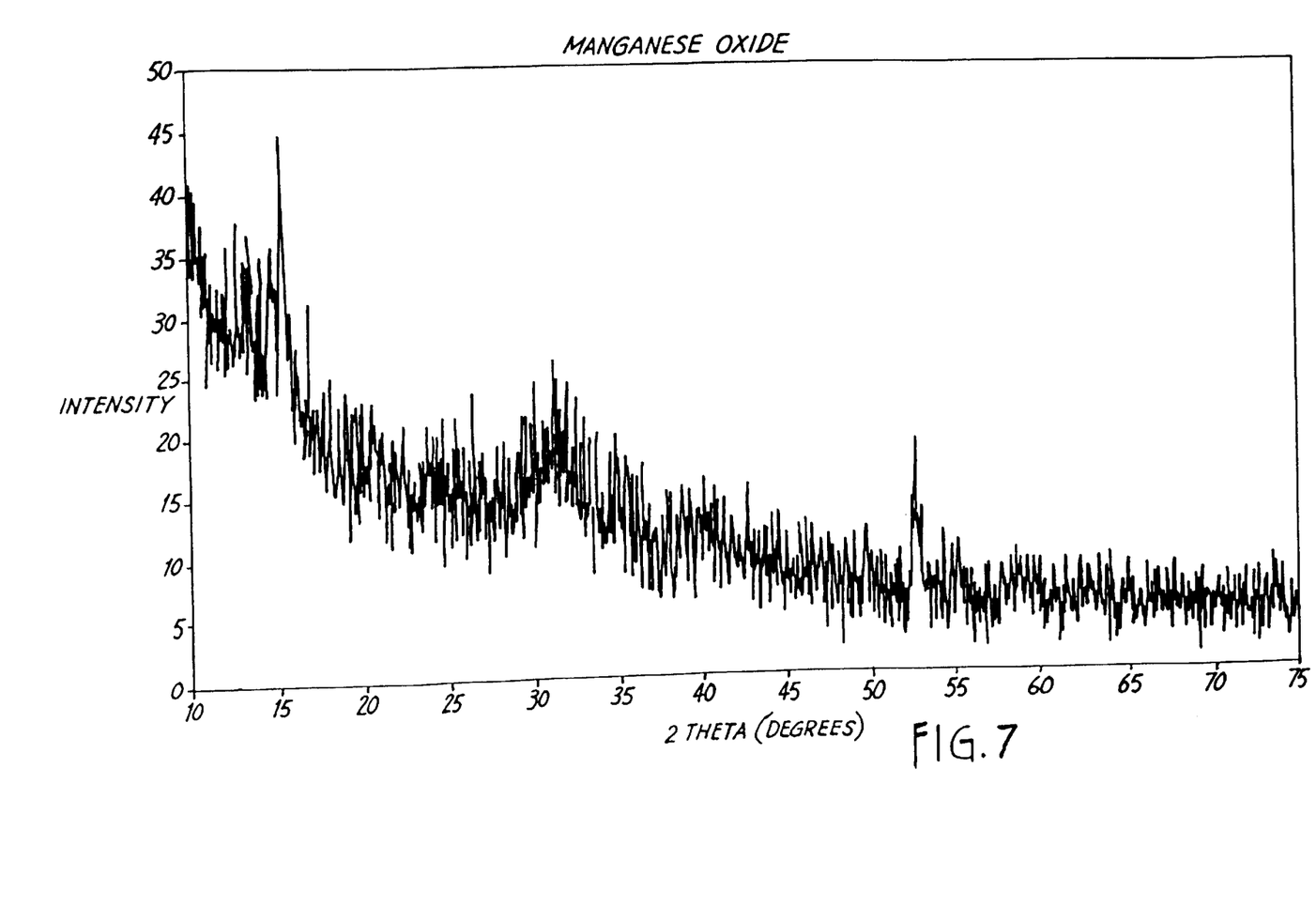
FIG. 7 is an x-ray diffractogram of nanoparticles of lithiated manganese oxide produced by laser pyrolysis of a reactant stream with an aerosol.

|  | 1 |
| --- | --- |
| Crystal Structure | Amorphous |
| Pressure (Torr) | 450 |
| Argon-Window (SCCM) | 700 |
| Argon-Shielding (SLM) | 5.6 |
| Ethylene (SLM) | 1.27 |
| Argon (SLM) | 1.46 |
| Oxygen (SLM) | 1.07 |
| Laser Output (Watts) | 590 |
| Li Precursor | 4 M Lithium Chloride |
| Mn Precursor | 4 M Manganese Chloride |
| Precursor Temperature ° C. | Room Temperature | sccm = standard cubic centimeters per minute
slm = standard liters per minute
Argon-Win. = argon flow through inlets 216, 218
Argon-Sld. = argon flow through annular channel 142.
Argon = Argon directly mixed with the aerosol The production rate of manganese oxide/lithiated manganese oxide particles was typically about 1 g/hr. To evaluate the atomic arrangement, the samples were examined by x-ray diffraction using the Cu(Kα) radiation line on a Siemens D500 x-ray diffractometer. X-ray diffractograms for a sample produced under the conditions specified in Table 1 is shown in FIG. 7. The x-ray diffractogram shown in FIG. 7 indicates that the sample was amorphous. In particular, a broad peak from about 27° to about 35° corresponds to the amorphous lithiated manganese oxide. A sharp peak at about 15° is due to the presence of a trace amount of manganese chloride contamination. A sharp peak at 53° is due to a trace amount of an unidentified contaminant.

Example 2
Heat Treatment

A sample of manganese oxide/lithiated manganese oxide nanoparticles produced by laser pyrolysis according to the conditions specified in the Example 1 were heated in an oven under oxidizing conditions. The oven was essentially as described above with respect to FIG. 6. Between about 100 and about 300 mg of nanoparticles were placed in an open 1 cc vial within the quartz tube projecting through the oven. Oxygen gas was flowed through a 1.0 inch diameter quartz tube at a flow rate of 308 cc/min. The oven was heated to about 400° C. The particles were heated for about 16 hours.

Figure 8:
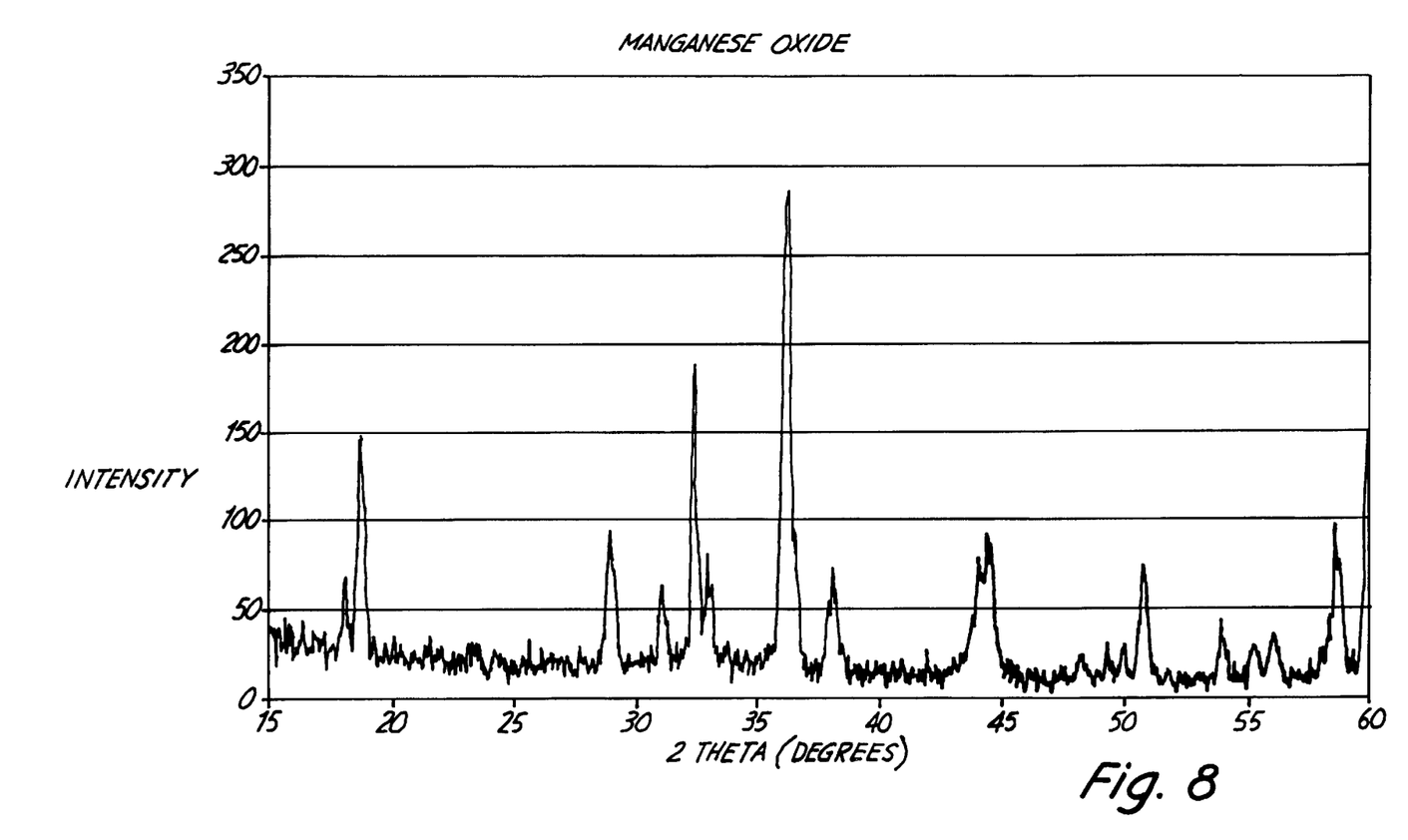
FIG. 8 is an x-ray diffractogram of nanoparticles of lithiated manganese oxide following heating in an oven.

The crystal structure of the resulting heat treated particles were determined by x-ray diffraction. The x-ray diffractogram for heated sample is shown in FIG. 8. The x-ray diffractogram shown in FIG. 8 indicates that the collection of particles involved mixed phase material with major components of $LiMn_2O_4$ (about 60% by volume) and $Mn_3O_4$ (about 30% by volume) and a minor component of $Mn_2O_3$ (about 10% by volume). The $LiMn_2O_4$ compound has a cubic spinel crystal structure. It is possible that the sample included additional amorphous phases of materials. In particular, based on the amount of lithium introduced in the reactant stream, the sample presumably contains additional lithium that is not identified in the crystalline phases.

The embodiments described above are intended to be illustrative and not limiting. Additional embodiments are within the claims. Although the present invention has been described with reference to preferred embodiments, workers skilled in the art will recognize that changes may be made in form and detail without departing from the spirit and scope of the invention.

What is claimed is:

1. A method of producing composite metal oxide particles, the method comprising reacting an aerosol to form a powder of composite metal oxide particles with an average diameter less than about 500 nm, the aerosol comprising a first metal compound precursor and a second metal compound precursor, wherein the reaction is driven by heat absorbed from a light beam and wherein the light beam intersects the aerosol at a reaction zone.

2. The method of claim 1 wherein the composite metal oxide comprises lithiated manganese oxide.

3. The method of claim 1 wherein the composite metal oxide comprises lithiated vanadium oxide.

4. The method of claim 1 wherein a metal precursor comprises a compound selected from the group consisting of $MnCl_2$ and $MnNO_3$.

5. The method of claim 1 wherein a metal precursor comprises a compound selected from the group consisting of LiCl and $Li_2NO_3$.

6. The method of claim 1 wherein a metal precursor comprises $VOCl_2$.

7. The method of claim 1 wherein the light beam is generated by an infrared laser.

8. The method of claim 1 wherein the reaction is performed in a reaction chamber, the chamber having a cross section along a direction perpendicular to a reactant stream with a dimension along a major axis greater than a factor of about two larger than a dimension along a minor axis.

9. The method of claim 8 wherein the aerosol is elongated along the major axis of the reaction chamber.

10. The method of claim 1 wherein the aerosol comprises a third metal precursor.

11. The method of claim 1 wherein the aerosol is generated by an ultrasonic aerosol generator.

12. The method of claim 1 wherein the aerosol is generated by a mechanical atomization aerosol generator.

13. A method for producing lithium metal oxide, the method comprising pyrolyzing a reactant stream in a reaction chamber, the reactant stream comprising a lithium precursor, a non-lithium metal precursor, and an oxidizing agent, where the pyrolysis is driven by heat absorbed from a light beam.

14. The method of claim 13 wherein the reactant stream comprises an aerosol.

15. The method of claim 14 wherein the aerosol is generated by an ultrasonic aerosol generator.

16. The method of claim 14 wherein the aerosol is generated by a mechanical atomization aerosol generator.

17. The method of claim 14 wherein the aerosol comprises a solution with a metal compound and a lithium compound.

18. The method of claim 17 wherein the metal compound comprises a manganese compound.

19. The method of claim 13 wherein the light beam comprises a laser beam generated by an infrared laser.

20. A method of producing a composite metal oxide particles, the method comprising reacting an aerosol to form a powder of composite metal oxide particles with an average diameter less than about 1 micron, the aerosol comprising a first metal compound precursor and a second metal compound precursor, wherein the reaction is performed in a reaction chamber, the chamber having a cross section along a direction perpendicular to a reactant stream with a dimension along a major axis greater than a factor of about two larger than a dimension along a minor axis.

21. The method of claim 20 wherein the reaction is driven by heat absorbed from a light beam.

* * * * *